US012711030B2

(12) United States Patent
Shute

(10) Patent No.: US 12,711,030 B2
(45) Date of Patent: Aug. 18, 2026

(54) METHOD TO DETECT BOOT FAILURE OF PEER COMPUTE NODE BY DETERMINING IF WATCHDOG TIMERS EXCEEDS THRESHOLD OF NORMAL BOOT OPERATION

(71) Applicant: STRATUS TECHNOLOGIES IRELAND LTD., Dublin (IE)

(72) Inventor: Derek Shute, Ashland, MA (US)

(73) Assignee: STRATUS TECHNOLOGIES IRELAND LTD. (IE)

( * ) Notice: Subject to any disclaimer, the term of this patent is extended or adjusted under 35 U.S.C. 154(b) by 278 days.

(21) Appl. No.: 18/399,466

(22) Filed: Dec. 28, 2023

(65) Prior Publication Data

US 2025/0130899 A1 Apr. 24, 2025

Related U.S. Application Data

(60) Provisional application No. 63/545,153, filed on Oct. 20, 2023.

(51) Int. Cl.
*G06F 11/20* (2006.01)
*G06F 11/14* (2006.01)

(52) U.S. Cl.
CPC ........ *G06F 11/203* (2013.01); *G06F 11/2023* (2013.01); *G06F 11/2028* (2013.01); *G06F 11/2038* (2013.01); *G06F 11/2048* (2013.01); *G06F 11/2094* (2013.01); *G06F 11/1417* (2013.01)

(58) Field of Classification Search
CPC .................................................... G06F 11/203
See application file for complete search history.

(56) References Cited

U.S. PATENT DOCUMENTS

| | | | |
|---|---|---|---|
| 6,355,991 | B1 | 3/2002 | Goff et al. |
| 6,633,996 | B1 | 10/2003 | Suffin et al. |
| 6,687,851 | B1 | 2/2004 | Somers et al. |
| 6,691,225 | B1 | 2/2004 | Suffin |
| 6,691,257 | B1 | 2/2004 | Suffin |
| 6,708,283 | B1 | 3/2004 | Nevin et al. |
| 6,718,474 | B1 | 4/2004 | Somers et al. |
| 6,766,413 | B2 | 7/2004 | Newman |
| 6,766,479 | B2 | 7/2004 | Edwards |

(Continued)

OTHER PUBLICATIONS

Dong et al., “COLO: COarse-grain LOck-stepping Virtual Machine for Non-stop Service”, SoCC’13, Oct. 1-3, 2013, Santa Clara, California, USA, ACM 978-1-4503-2428-1; 16 pages.

(Continued)

*Primary Examiner* — Tammara R Peyton
(74) *Attorney, Agent, or Firm* — K&L GATES LLP

(57) ABSTRACT

In part, in one aspect, the disclosure relates to a method of monitoring an active compute node in a fault tolerant system. The method may include monitoring a boot process of a first compute node by interrogating one or more watchdog timers running on the first compute node during the boot process; determining a boot process outcome for the first compute node, wherein the boot process outcome is a failure if the one or more of the watchdog timers exceeds a threshold time indicative of normal boot operation; performing a first action if the outcome is a failure; and performing a second action if the outcome is not a failure.

19 Claims, 5 Drawing Sheets

(56) References Cited

U.S. PATENT DOCUMENTS

| | | | |
|---|---|---|---|
| 6,802,022 | B1 | 10/2004 | Olson |
| 6,813,721 | B1 | 11/2004 | Tetreault et al. |
| 6,842,823 | B1 | 1/2005 | Olson |
| 6,862,689 | B2 | 3/2005 | Bergsten et al. |
| 6,874,102 | B2 | 3/2005 | Doody et al. |
| 6,886,171 | B2 | 4/2005 | MacLeod |
| 6,928,583 | B2 | 8/2005 | Griffin et al. |
| 6,948,010 | B2 | 9/2005 | Somers et al. |
| 6,970,892 | B2 | 11/2005 | Green et al. |
| 6,971,043 | B2 | 11/2005 | McLoughlin et al. |
| 6,996,750 | B2 | 2/2006 | Tetreault |
| 7,065,672 | B2 | 6/2006 | Long et al. |
| 7,496,786 | B2 | 2/2009 | Graham et al. |
| 7,496,787 | B2 | 2/2009 | Edwards et al. |
| 7,669,073 | B2 | 2/2010 | Graham et al. |
| 7,904,906 | B2 | 3/2011 | Puthukattukaran et al. |
| 7,958,076 | B2 | 6/2011 | Bergsten et al. |
| 8,117,495 | B2 | 2/2012 | Graham |
| 8,161,311 | B2 | 4/2012 | Wiebe |
| 8,234,521 | B2 | 7/2012 | Graham et al. |
| 8,271,416 | B2 | 9/2012 | Al-Biek et al. |
| 8,312,318 | B2 | 11/2012 | Graham et al. |
| 8,381,012 | B2 | 2/2013 | Wiebe |
| 8,812,907 | B1 | 8/2014 | Bissett et al. |
| 9,251,002 | B2 | 2/2016 | Manchek et al. |
| 9,588,844 | B2 | 3/2017 | Bissett et al. |
| 9,652,338 | B2 | 5/2017 | Bissett et al. |
| 9,760,442 | B2 | 9/2017 | Bissett et al. |
| 10,216,598 | B2 | 2/2019 | Haid et al. |
| 10,360,117 | B2 | 7/2019 | Haid et al. |
| 11,288,143 | B2 | 3/2022 | Horvath et al. |
| 11,550,655 | B2 * | 1/2023 | Yu ........................... G06F 8/654 |
| 11,586,504 | B2 * | 2/2023 | Lin ....................... G06F 9/4406 |
| 11,586,514 | B2 | 2/2023 | Pawlowski et al. |
| 2001/0042202 | A1 | 11/2001 | Horrath et al. |
| 2002/0016935 | A1 | 2/2002 | Bergsten et al. |
| 2002/0070717 | A1 | 6/2002 | Pellegrino |
| 2003/0046670 | A1 | 3/2003 | Marlow |
| 2003/0095366 | A1 | 5/2003 | Pellegrino |
| 2006/0222125 | A1 | 10/2006 | Edwards et al. |
| 2006/0222126 | A1 | 10/2006 | Edwards et al. |
| 2006/0259815 | A1 | 11/2006 | Graham et al. |
| 2006/0274508 | A1 | 12/2006 | LaRiviere et al. |
| 2007/0011499 | A1 | 1/2007 | Begsten et al. |
| 2007/0028144 | A1 | 2/2007 | Graham et al. |
| 2007/0038891 | A1 | 2/2007 | Graham |
| 2007/0106873 | A1 | 5/2007 | Lally et al. |
| 2007/0174484 | A1 | 7/2007 | Lussier et al. |
| 2009/0249129 | A1 | 10/2009 | Femia |
| 2015/0205688 | A1 | 7/2015 | Haid et al. |
| 2015/0263983 | A1 | 9/2015 | Brennan et al. |
| 2017/0324609 | A1 | 11/2017 | Hong et al. |
| 2018/0046480 | A1 | 2/2018 | Dong et al. |
| 2018/0088962 | A1 * | 3/2018 | Balakrishnan ...... G06F 11/0757 |
| 2018/0143885 | A1 | 5/2018 | Dong et al. |
| 2021/0034447 | A1 | 2/2021 | Horvath et al. |
| 2021/0034464 | A1 | 2/2021 | Dailey et al. |
| 2021/0034465 | A1 | 2/2021 | Haid et al. |
| 2021/0034483 | A1 | 2/2021 | Haid |
| 2021/0034523 | A1 | 2/2021 | Dailey |
| 2021/0037092 | A1 | 2/2021 | Cao |
| 2023/0185681 | A1 | 6/2023 | Pawlowski et al. |
| 2023/0291721 | A1 | 9/2023 | Robinson |
| 2024/0176739 | A1 | 5/2024 | Alden et al. |

OTHER PUBLICATIONS

Dong et al., “COLO: COarse-grain LOck-stepping Virtual Machine for Non-stop Service”, https://www.linux-kvm.org/images/1/1d/Kvm-forum-2013-COLO.pdf; 24 pages.

* cited by examiner

FIG. 4
400
Compute Node A (Active Candidate)
412
WDT is "FRB2"
414
Compute Node Hangs or Fails in Self Test
416
IPMI over shared IPMB
Compute Node B (Observing Standby)
422
Observes "FRB2"
424
Observes WDT Timeout
426
Compute Node B Assumes Control
428

METHOD TO DETECT BOOT FAILURE OF PEER COMPUTE NODE BY DETERMINING IF WATCHDOG TIMERS EXCEEDS THRESHOLD OF NORMAL BOOT OPERATION

CROSS REFERENCE TO RELATED APPLICATIONS

This application is a U.S. patent application which claims priority to and the benefit of U.S. Provisional Patent Application No. 63/545,153, filed on Oct. 20, 2023.

FIELD

This disclosure relates generally to the field of field of failover, redundancy, and fault tolerance in computing systems.

BACKGROUND

Contemporary computing systems with high availability requirements make use of resource redundancy and failover mechanisms for various purposes.

SUMMARY

In part, in one aspect, the disclosure relates to a method to detect a failure of a boot process in a first boot node by a second boot node. In part, in one aspect, the method includes exchanging one or more messages via a low-level communications medium, such as an intelligent platform management bus (IPMB). In part, in one aspect, the second boot node observes a state of a watchdog timer on the first process, and if a boot failure is detected, the second compute node may decide to assume control of the first compute node, such as by reprovisioning its IO devices and/or taking over as the active computer or otherwise taking some executive action relative to the first compute node and/or to send a notification to a remote node, or to take no action.

In part, in another aspect, the disclosure relates to a method of monitoring an active compute node in a fault tolerant system. The method may include monitoring a boot process of a first compute node by interrogating one or more watchdog timers running on the first compute node during the boot process; determining a boot process outcome for the first compute node, wherein the boot process outcome is a failure if the one or more of the watchdog timers exceeds a threshold time indicative of normal boot operation; performing a first action if the outcome is a failure; and performing a second action if the outcome is not a failure.

In some embodiments, the monitoring process is performed using a second compute node of the fault tolerant system. In many embodiments, determining the boot process outcome is performed using the second compute node of the fault tolerant system. In some embodiments, the first compute node and the second compute node are connected using a communication interface, wherein watchdog timer values are received at the second compute node from the first compute node using the communication interface.

In various embodiments, the communication interface is an Intelligent Platform Management Interface (IPMI), wherein the first compute node comprises a first BMC, wherein the second compute node comprises a second BMC, wherein the second BMC performs the interrogation of the one or more watchdog times. In many embodiments, the first action is rebooting the first compute node. In various embodiments, the first action is generating an alert or a log indicative of a problem with the first computer node. In some embodiments, the second action is initiating a migration process such that the second compute node can take over for the first compute node with the second compute node becoming the active node.

In various embodiments, the second action is reprovisioning a plurality of peripheral devices from the first compute node to the second compute node. In many embodiments, the boot process comprises a Unified Extensible Firmware Interface (UEFI) control phase and an operating system (OS) control phase. In various embodiments, the one or more watchdog timers include a first watchdog timer and a second watchdog timer that are started during the UEFI control phase of the boot process.

In many embodiments, the one or more watchdog timers further comprises a third watchdog timer that is started during the OS control phase of the boot process. In various embodiments, in response to all of the first, second, and third watchdog timers not exceeding their respective threshold values, the second action is for the first compute node to remain the active node.

In part, in yet another aspect, the disclosure relates to a fault tolerant computer system. The system may include a first compute node comprising a Fault Resilient Boot (FRB) hardware device, wherein the FRB hardware device is configured to generate a set of watchdog timers, wherein each watchdog timer in the set corresponds to a phase or an event in a boot process; a communications interface; a management processor; and a second compute node, wherein the second compute node is in communication with the FRB hardware device using the communications interface, wherein the second compute node comprises the management processor, the management processor configured to read each watchdog timer in the set of watchdog timers, the management processor configured to determine if each watchdog timer exceeds a threshold time for its respective phase of the boot process, wherein not exceeding the threshold time for each respective timer corresponds to the normal operation of the compute node during the corresponding phase of the boot process.

In some embodiments, the communications interface is an intelligent platform management bus or an IPMI. In some embodiments, the management processor is a BMC. In many embodiments, the second compute node is configured to take control of the first compute node in response to one or more of the threshold times for each respective watchdog timer being exceeded. In various embodiments, the second compute node is configured to reboot the first compute node in response to one or more of the threshold times for each respective watchdog timer being exceeded. In some embodiments, the second compute node is configured to initiate a transfer of processor state and memory information from the first compute node to the second compute node in response to one or more of the threshold times for each respective watchdog timer being exceeded. In many embodiments, the second compute node is configured to generate a report or an error log in response to one or more of the threshold times for each respective watchdog timer being exceeded.

Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Figure 1:
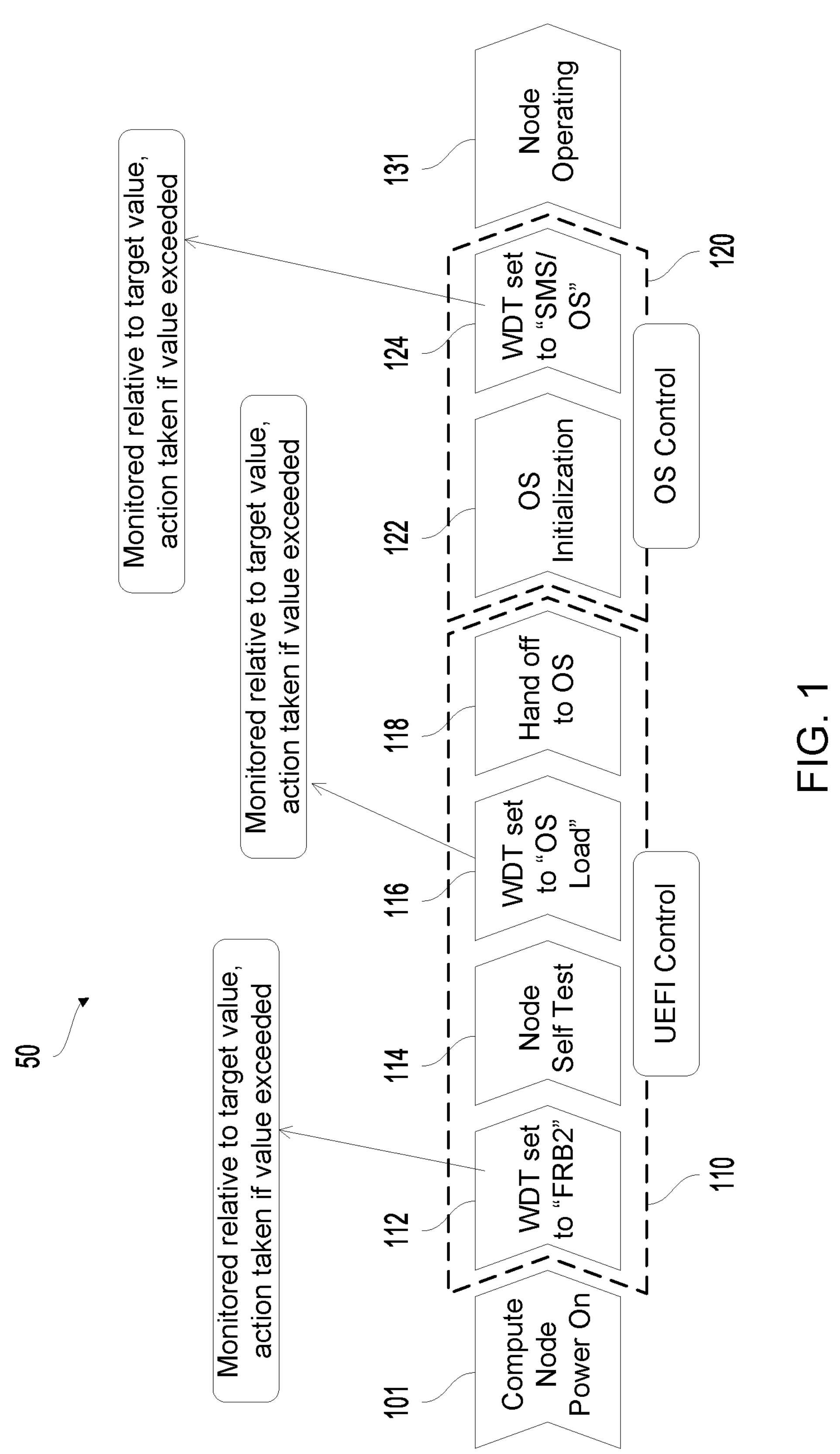
FIG. 1 is a flow chart describing a compute node process, including watchdog timer transactions, according to an exemplary embodiment of the disclosure.

In many embodiments, a computer system also referred to as a compute node ordinarily undergoes a boot process in isolation and may not fully diagnose failure in boot media or may not consider the risks of using corrupted boot media or problems associated with shared IO devices. In some embodiments, of the current disclosure, two compute nodes, such as a first compute node and a second compute node, are configured to share a low-level communications channel such as through a BMC or other interface that supports the methods and flow of timer information described herein. In some embodiments, the low-level communications channel allows a second node to monitor a boot process of a first node. In some embodiments, after observing a boot failure in the first compute node, the second compute node may decide to assume control of the first compute node, to send a notification to a remote node, or to take no action.

Present technology typically does not diagnose failure to the level of determining if the boot disks are safe to use, or at least does not consider the risks of using a bad disk. As a result, the systems and methods described herein can help discover such a problematic scenario before it occurs. Some features of the disclosure may leverage Fault Resilient Boot (FRB) technology to provide various systems and methods to support a customer's goals, which typically include fault tolerant operation of a multi-node computer system. In part, FRB includes a set of technologies designed to increase the likelihood that a customer's computer system boots to a point of normal operation during which a customer's applications and desired services are running as expected. For a fault tolerant system that includes a plurality or set of compute nodes, each node can observe, such as by monitoring various signals and information, the low-level operation of a peer compute node, and each such compute node can assume the role of running the customer's applications and services (becoming the "Active") by assigning itself the hardware resources that contains the customer's data and software. For example, if an active compute node starts to fail or identifies that it may fail, that active node can start a migration process or failover process by which another peer computer node, such a standby node, will receive information such as processor state and memory information from the active node. This received information can be received as part of a migration process and allows the standby compute node to take over for the active node and effectively behave as the active node would have behaved given the received information.

In part, the disclosure supports a compute node being able determine if the active peer node has failed due to a damaged or corrupt active system disk or if it failed due to a hardware problem inherent to the node itself. The ability to monitor and evaluate a computer node to make such a determination about the source of a failure provides a level of assurance that the active resources can be safely used by this node. That is, determining if a bad disk or other peripheral effectively caused one compute node to fail provides useful hardware information. If another compute node is selected to take over as the new active node having the useful hardware information can allow the compute node selected to be the new active node to avoid connecting to the problematic hardware and avoid the fate of the failing or failed active node.

In various embodiments, an observing node, such a standby node, may use different watchdog timers that are configurable as part of fault resilient boot (FRB) to detect different errors. During the operation of the fault tolerant system that includes the two or more nodes, an active node may go through a first boot and acquire a set of provisioned devices and then proceed through a second boot process which may hang as a result of an error caused by the devices. To avoid this unwanted scenario and the associated potential loss of fault tolerant operation, the observing standby node can use a watchdog timer to detect a potential error state in second boot in response to expiry of the timer. In some embodiments, other error states/events can be detected using various FRB timers and them being exceeded relative some expected timer values or ranges.

Refer now to the example embodiment of FIG. 1. FIG. 1 is a flow chart 50 that summarizes a boot process of a compute node in a fault tolerant computing system. The boot process shown with regard to a compute node boot is provide with an IPMI/BMC implemented Watchdog Timer (WDT) configured to support the features of the disclosure described herein. In the boot process, the compute node is first powered on 101. In many embodiments, the boot process enters a phase of UEFI control 110 shown by the first set of dotted lines that include steps 112, 114, 116, and 118 in the UEFI control portion of the boot. In many embodiments, the UEFI controlled phase comprises steps: setting a watchdog timer (WDT) to a fault resistant boot (FRB2) state 112, a self-test of the compute node 114, setting the WDT to an "OS Load" state 116, and UEFI relinquishing control to an operating system 118. In many embodiments, a phase of operating system control follows 120.

In various embodiments, the OS control phase comprises steps: an operating system initialization 122 followed by setting a watchdog timer to an "SMS/OS" state 124. In some embodiments, SMS refers to "System Management Software." In some embodiments, a given service of the OS may operate to control or adjust one or more timers and imposes set system policy and parameters such as, for example failure action, timeout length, on or off, etc. The service may be part of or managed by or during the SMS state. Finally, after these steps, the node has booted to a normal operating state 131. The WDT mechanism provides recovery paths for intermittent problems seen during the boot process: unless UEFI or OS boot proceeds through boot in a timely fashion, it becomes subject to an action by the BMC or another fault tolerant system component. That is, if the various WDT values that are expected are exceeded or exceeded by a particular timer period. That action depends on operator policy and can involve an immediate power down, a reset and retry of the boot process, or a power cycle and retry.

In various embodiments, two or more compute nodes may have equal access or configurable access to a common set of devices that may be 'assigned' to one node or the other by hardware/software action or may be equally reachable and usable at all times. In cases where the compute nodes are intended for resilient operation, one node may "take over" operation from the other in certain circumstances. The process of taking over may be through a smart exchange process, a live migration, a failover, and other processes by which a standby node takes over for an active node. In some embodiments, the process of one node taking over for another node may also use common devices such as shared disks, peripherals, and other IO devices and booting an operating system from them or using them at the direction of the compute node that will become the new active node. One or more or all compute nodes may be configured to assess the health of not just another node but also the common devices the nodes share, use, or otherwise connect to and include in their device hierarchies.

One feature of the systems and methods disclosed herein provide the tools for a compute node to determine if it should assume control of the common devices shared with another node and take over to act as the active node with such devices being part of an active configuration, or if doing so would further compromise the system. In various embodiments, a IPMI Watchdog (a given BMC may monitor timer values in the boot process as disclosed herein such as with regard to FIG. 1) may serve as the mechanism or tool by which an observing node (generally identified as node B) ascertains if the peer ("A") arrives at a target configuration that is expected or experiences problems indicated by deviations from the expected watchdog times for various stages of its reboot, configuration, etc. In various embodiments, the BMC performs the monitoring and interacts with compute node and system components using the Intelligent Platform Management Interface (IPMI). IPMI is a standardized message-based hardware management interface that works in conjunction with system hardware such as the BMC. The BMC is a hardware chip that can perform various monitoring functions such as those described herein and generate outputs such as control signals to cause changes to or stop events from occurring with regard to a given compute node or other hardware in the fault tolerant system.

Figure 2:
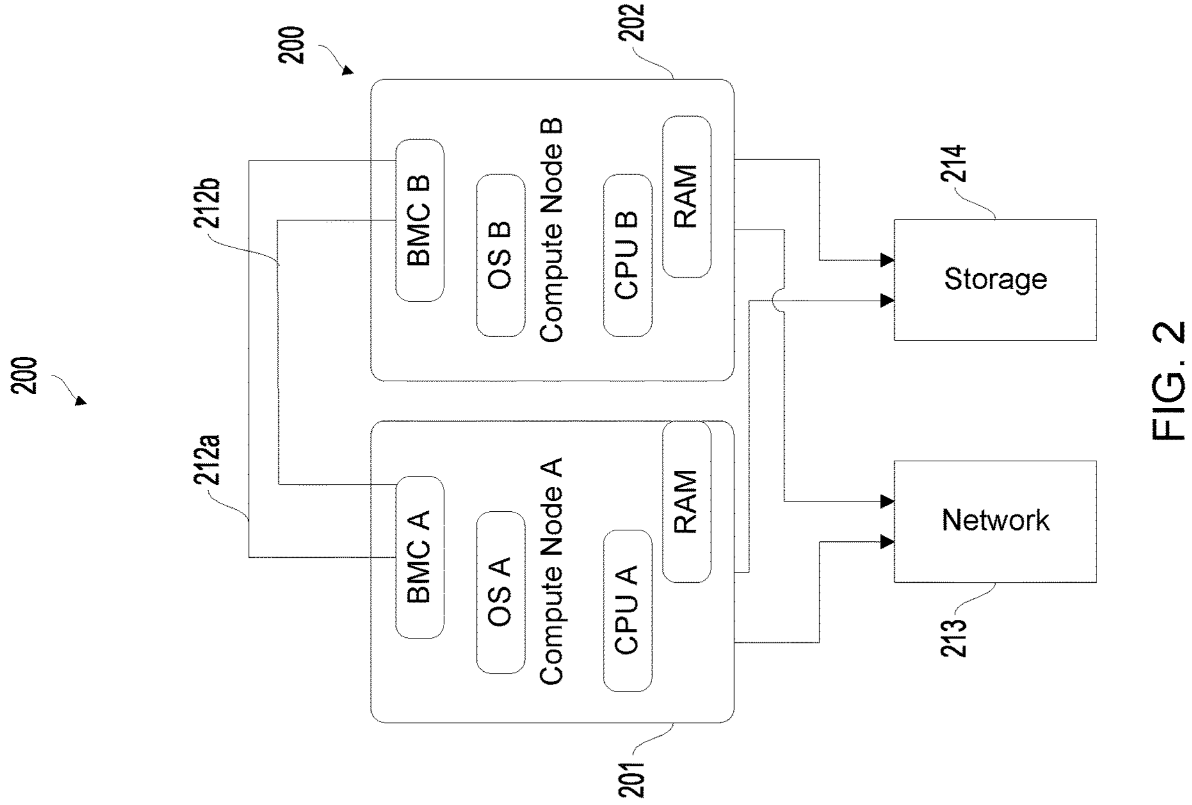
FIG. 2 is a block diagram of two compute nodes with shared access to storage and network devices according to an exemplary embodiment of the disclosure.

FIG. 2 is a block diagram depicting a fault tolerant computer system 200 that includes a first compute node A 201 and a second compute node B 202. In some embodiments, the first compute node and the second compute node share access to network 213 and storage 214 devices. Each compute node includes one or more processors (CPU), memory (RAM), operating systems (OS) and various chipsets, devices and functions for operation and monitoring.

In some embodiments, such as that shown in FIG. 2 baseboard management controller (BMC) hardware and connections exist in common between the two nodes such as nodes 200, 201, allowing node B to examine the WDT of node A. In this way, the BMC may perform the WDT monitoring of FRB2 time, OS load time, and SMS/OS time shown in FIG. 1. In various embodiments, each BMC may exchange information with the other BMC in one or both directions along each communication channel 212*a*, 212*b*. The ability to monitor the WDTs of node A allows node B to identify when a compute node is having a problem with a common device or another part of its boot or operating cycle based on knowing expected timer ranges and being able to alert or take other action when those expected timer ranges are exceeded.

Figure 3:
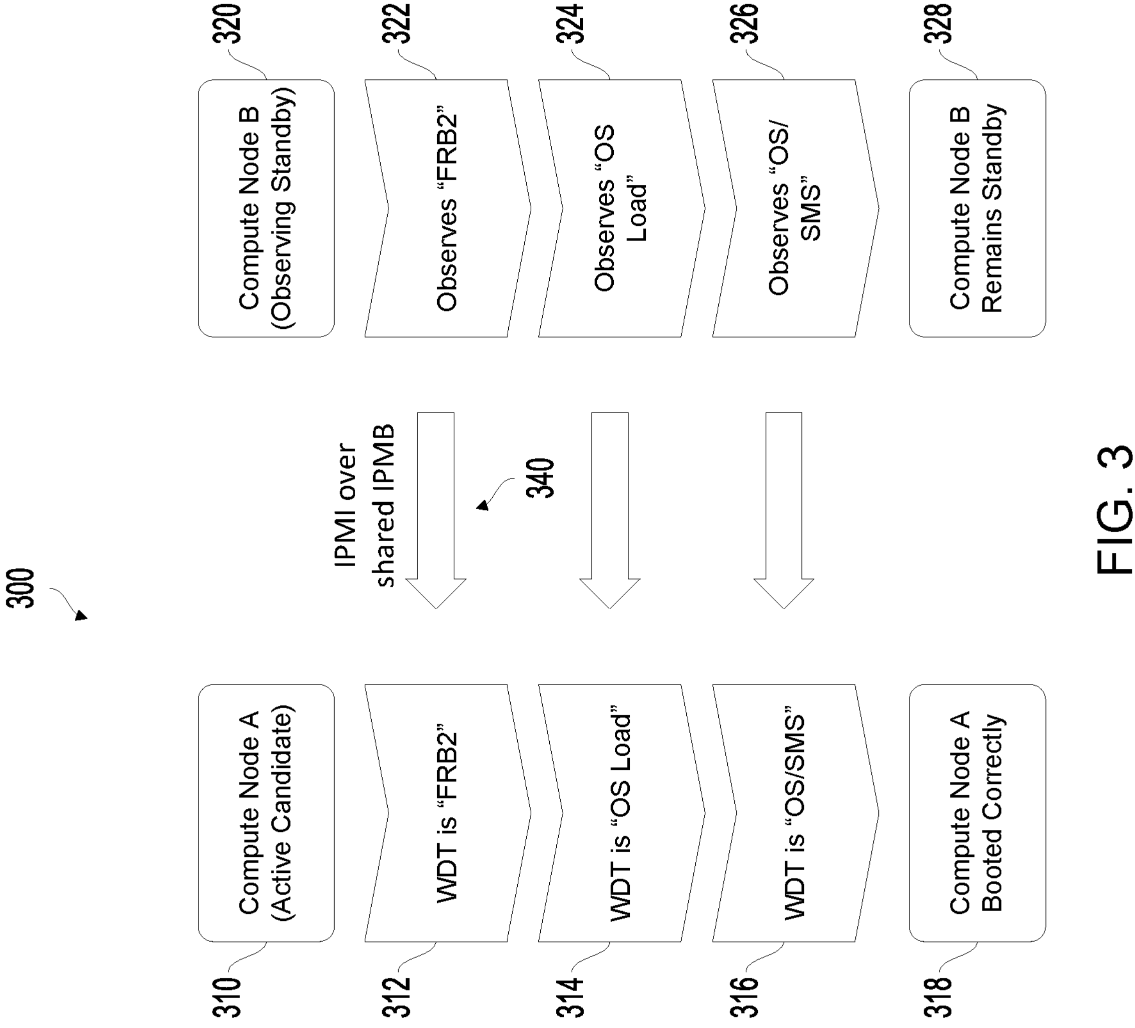
FIG. 3 is a flow chart describing a correct boot process of a first compute node as a second compute node observes the boot process according to an exemplary embodiment of the disclosure.

Refer now to the example embodiment of FIG. 3. FIG. 3 is a flow chart of a successful peer-monitored boot process of a first compute node A 310. In many embodiments, a second compute node B 320 monitors the boot process of the first compute node. In some embodiments, the second node is able to monitor the boot process of the first node because the first compute node and the second compute node share a low-level communications interface such as the IPMI working with the BMC or other low-level commination interfaces. In some embodiments, the shared interface may be a shared intelligent platform management bus (IPMB) carrying intelligent platform management interface (IPMI) transactions 340. In some embodiments, a baseboard management controller (BMC) implements an IPMI. In many embodiments, the second compute node monitors the boot process of the first node by interrogating a watchdog timer (WDT) of the first node. The watchdog timer transitions between a few states, signifying various stages in the boot process.

In a normal or successful peer-monitored boot process, the first compute node sets its watchdog timer to an FRB2 state 312, which is observed by the second compute node 322. The first node then begins to load an operating system and sets the watchdog timer to an "OS Load" state, which is observed by the second compute node 324. Finally, the first compute node, having loaded the operating system successfully, sets the watchdog timer to an "OS/SMS" state 316, which is observed by the second node 326. In this state, the first compute node is considered to have completed the boot process correctly 318 and the second compute node remains in a standby state 328.

Figure 4:
FIG. 4 is a flow chart describing a hung boot process of a first compute node as a second compute node assumes control of the boot process of the first node according to an exemplary embodiment of the disclosure.

In some embodiments, a first compute node may experience a failure in a boot process and a second compute node may then assume control of the boot process of the first node. Refer now to the example embodiment of FIG. 4. FIG. 4 is a flow chart of peer-monitored boot process 400 of a first compute node A 412 that hangs or fails during a self-test 416. In some embodiments, a second compute node B 422 monitors the boot process, which begins with the first compute node setting a watchdog timer to an FRB2 status 414. In many embodiments, this status is observed by the second node 424. In some embodiments, when the boot process of the first node hangs or fails during a self-test, the second node observes a timeout of the watchdog timer 426. In some embodiments, the second compute node 424 then assumes control, ownership, or another execute action relative to the first node 412. In many embodiments, the second compute node 424 takes over, controls, or is effectively the owner/manner of the provisioned devices 428 and may power down the faulty node (first compute nod 412) in order to do so. In other embodiments, the second compute node 424 (standby) is operational and will cause a reboot in order to pick up the active OS from the provisioned devices.

In FIG. 4, node B detects that node A fails in the "FRB2" setting, which according the boot process of FIG. 1 indicates that node B did not exit UEFI self-test. Node B can conclude that the common devices such as the network card 213 and storage deice 214 are not involved in the failure. It is therefore possible for Node B to take control of the common devices and attempt to recover. From this example it is clear that the watchdog timer approach allows for a more granular analysis of the types of failures and identifies circumstances when node B can more safely take over for node A. In various embodiments, a second compute node (node B) may assume control or take on the role of or the responsibilities of the first compute node (node A), such as by reprovisioning its IO devices and/or taking over as the active computer or otherwise taking some executive action relative to the first compute node and/or the second compute node and/or the overall fault tolerant system and any other components thereof.

In some embodiments, a first compute node may experience a failure in a boot process, after which a second compute node has an opportunity to assume control of the boot process of the first node. However, in some embodiments, the second node may decline to assume control of the first node. In many embodiments, the second node may determine that, were control to be assumed, the same boot process failure that occurred in the first node will be experienced in the second node also. In various embodiments, rather than assuming control of the first node, the second node may send a notification of a boot failure to a remote node. In some embodiments, the second node may take no action. In various embodiments, compute node B taking control of compute node B may include treating node A as a failing node and compute node B taking over as the active node or context for node A through a smart exchange, migration, or failover process.

Figure 5:
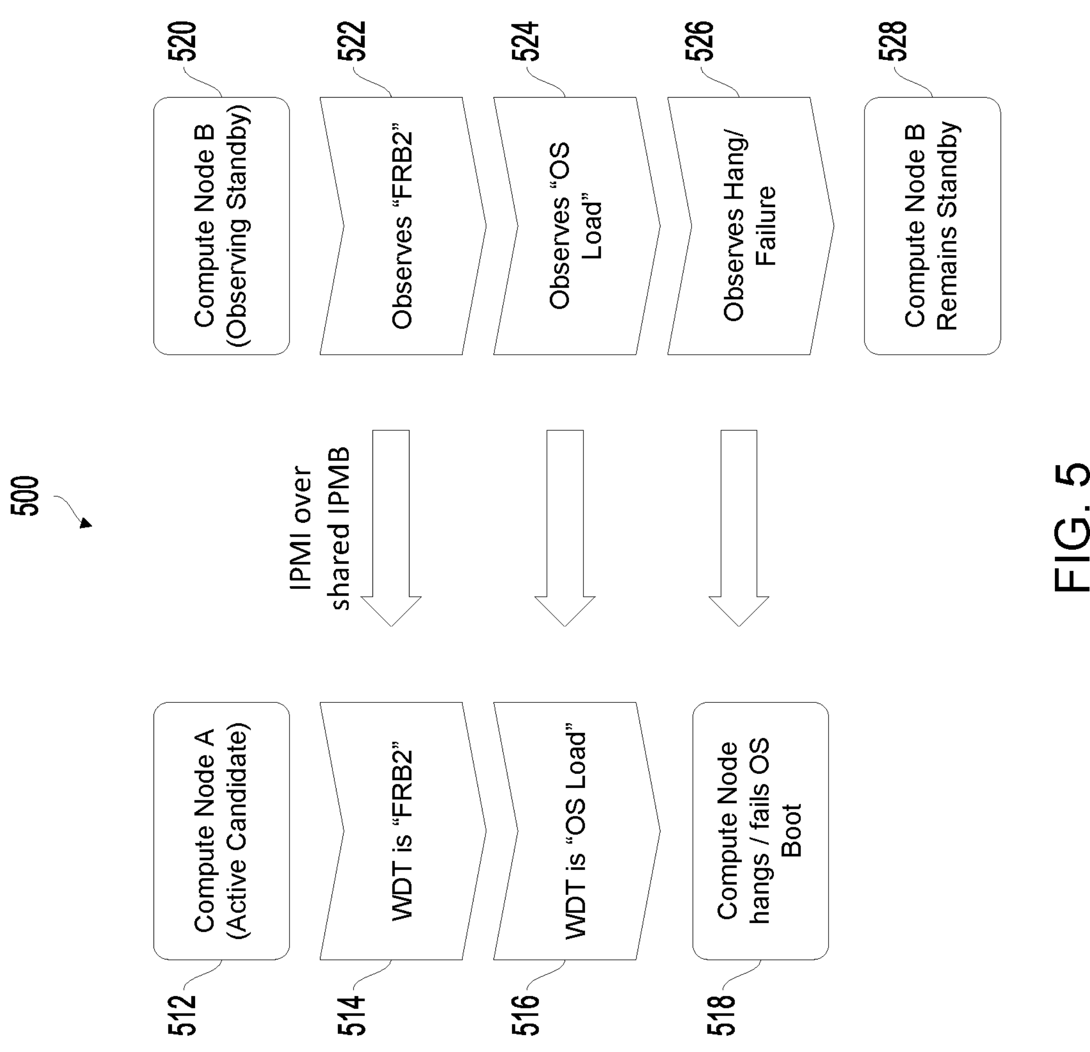
FIG. 5 is a flow chart describing a failure to boot an operating system of a first compute node wherein a second compute node observing the boot process declines to assume control of the boot process of the first node according to an exemplary embodiment of the disclosure.

Refer now to the example embodiment of FIG. 5. FIG. 5 is a flow chart depicting a peer-monitored boot process of a first compute node A 512 wherein the boot process fails while loading an operating system 518. In many embodiments, the boot process begins and the first compute node A sets its watchdog timer to an FRB2 status 514, which is observed by the second compute node 522. The first compute node then sets the watchdog timer to an "OS Load" state, which is observed 524 by the second compute node 520. At this point, the boot process of the first node fails during a loading of an operating system 518, which is observed by the second compute node 526 as a timeout of the watchdog timer. Finally, the second compute node B 520 remains in a standby state 528 rather than assuming control of the first compute node.

Unless specifically stated otherwise as apparent from the following discussion, it is appreciated that throughout the description, discussions utilizing terms such as "processing" or "computing" or "calculating" or "delaying" or "comparing", "generating" or "determining" or "forwarding" or "deferring" "committing" or "interrupting" or "handling" or "receiving" or "buffering" or "allocating" or "displaying" or "flagging" or Boolean logic or other set related operations or the like, refer to the action and processes of a computer system, or electronic device, that manipulates and transforms data represented as physical (electronic) quantities within the computer system's or electronic devices' registers and memories into other data similarly represented as physical quantities within electronic memories or registers or other such information storage, transmission or display devices.

The algorithms presented herein are not inherently related to any particular computer or other apparatus. Various general purpose systems may be used with programs in accordance with the teachings herein, or it may prove convenient to construct more specialized apparatus to perform the required method steps. The required structure for a variety of these systems is apparent from the description above. In addition, the present disclosure is not described with reference to any particular programming language, and various embodiments may thus be implemented using a variety of programming languages.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

The examples presented herein are intended to illustrate potential and specific implementations of the present disclosure. The examples are intended primarily for purposes of illustration of the disclosure for those skilled in the art. No particular aspect or aspects of the examples are necessarily intended to limit the scope of the present disclosure.

The figures and descriptions of the present disclosure have been simplified to illustrate elements that are relevant for a clear understanding of the present disclosure, while eliminating, for purposes of clarity, other elements. Those of ordinary skill in the art may recognize, however, that these sorts of focused discussions would not facilitate a better understanding of the present disclosure, and therefore, a more detailed description of such elements is not provided herein.

The processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component"

may include various computers or computer systems, or may include a reasonable combination of software, firmware, and/or hardware.

In various embodiments, of the present disclosure, a single component may be replaced by multiple components, and multiple components may be replaced by a single component, to perform a given function or functions. Except where such substitution would not be operative to practice embodiments of the present disclosure, such substitution is within the scope of the present disclosure. Any of the servers, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present disclosure. Programming languages for computer software and other computer-implemented instructions may be translated into machine language by a compiler or an assembler before execution and/or may be translated directly at run time by an interpreter.

Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present disclosure based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity.

Unless otherwise indicated, all numbers expressing lengths, widths, depths, or other dimensions and so forth used in the specification and claims are to be understood in all instances as indicating both the exact values as shown and as being modified by the term "about." As used herein, the term "about" refers to a ±10% variation from the nominal value. Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques. Any specific value may vary by 20%.

The invention may be embodied in other specific forms without departing from the spirit or essential characteristics thereof. The foregoing embodiments are therefore to be considered in all respects illustrative rather than limiting on the disclosure described herein. Scope of the invention is thus indicated by the appended claims rather than by the foregoing description, and all changes which come within the meaning and range of equivalency of the claims are intended to be embraced therein.

It will be appreciated by those skilled in the art that various modifications and changes may be made without departing from the scope of the described technology. Such modifications and changes are intended to fall within the scope of the embodiments that are described. It will also be appreciated by those of skill in the art that features included in one embodiment are interchangeable with other embodiments; and that one or more features from a depicted embodiment can be included with other depicted embodiments in any combination. For example, any of the various components described herein and/or depicted in the figures may be combined, interchanged, or excluded from other embodiments.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within +20% of a target value in some embodiments, within +10% of a target value in some embodiments, within +5% of a target value in some embodiments, and yet within +2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method of monitoring an active compute node in a fault tolerant system comprising:

monitoring a boot process of a first compute node, using a second compute node of the fault tolerant system, by interrogating one or more watchdog timers running on the first compute node during the boot process, wherein the first compute node is the active compute node;

determining a boot process outcome for the first compute node, wherein the boot process outcome is a failure if the one or more of the watchdog timers exceeds a threshold time indicative of normal boot operation;

performing a first action if the outcome is a failure; and performing a second action if the outcome is not a failure, wherein the second action is initiating a migration process such that the second compute node can take over for the first compute node with the second compute node becoming a new active compute node.

2. The method of claim 1, wherein determining the boot process outcome is performed using the second compute node of the fault tolerant system.

3. The method of claim 2, wherein the first compute node and the second compute node are connected using a communication interface, wherein watchdog timer values are received at the second compute node from the first compute node using the communication interface.

4. The method of claim 3, wherein the communication interface is an Intelligent Platform Management Interface (IPMI), wherein the first compute node comprises a first BMC, wherein the second compute node comprises a second BMC, wherein the second BMC performs the interrogation of the one or more watchdog times.

5. The method of claim 1, wherein the first action is rebooting the first compute node.

6. The method of claim 1, wherein the first action is generating an alert or a log indicative of a problem with the first computer node.

7. The method of claim 1, wherein the second action is reprovisioning a plurality of peripheral devices from the first compute node to the second compute node.

8. The method of claim 1, wherein the boot process comprises a Unified Extensible Firmware Interface (UEFI) control phase and an operating system (OS) control phase.

9. The method of claim 8, wherein the one or more watchdog timers, comprises a first watchdog timer and a second watchdog timer that are started during the UEFI control phase of the boot process.

10. The method of claim 9, wherein the one or more watchdog timers further comprises a third watchdog timer that is started during the OS control phase of the boot process.

11. The method of claim 10, wherein in response to all of the first, second, and third watchdog timers not exceeding their respective threshold values, the second action is for the first compute node to remain the active node.

12. The system of claim 1, wherein the fault tolerant system comprises the first computer node and the second compute node.

13. A fault tolerant computer system comprising:

a first compute node comprising a Fault Resilient Boot (FRB) hardware device, wherein the FRB hardware device is configured to generate a set of watchdog timers, wherein each watchdog timer in the set corresponds to a phase or an event in a boot process;

a communications interface;

a management processor; and a second compute node, wherein the second compute node is in communication with the FRB hardware device using the communications interface, wherein the second compute node comprises the management processor, the management processor configured to read each watchdog timer in the set of watchdog timers, the management processor configured to determine if each watchdog timer exceeds a threshold time for its respective phase of the boot process, wherein not exceeding the threshold time for each respective timer corresponds to the normal operation of the compute node during the corresponding phase of the boot process.

14. The system of claim 13, wherein the communications interface is an intelligent platform management bus or an IPMI.

15. The system of claim 14, wherein the management processor is a BMC.

16. The system of claim 15, wherein the second compute node is configured to take control of the first compute node in response to one or more of the threshold times for each respective watchdog timer being exceeded.

17. The system of claim 13 wherein the second compute node is configured to reboot the first compute node in response to one or more of the threshold times for each respective watchdog timer being exceeded.

18. The system of claim 13 wherein the second compute node is configured to initiate a transfer of processor state and memory information from the first compute node to the second compute node in response to one or more of the threshold times for each respective watchdog timer being exceeded.

19. The system of claim 13 wherein the second compute node is configured to generate a report or an error log in response to one or more of the threshold times for each respective watchdog timer being exceeded.

* * * * *